United States Patent [19]

Lee

[11] 4,023,452
[45] May 17, 1977

[54] FEEDSTOCK CUTTING AND FEEDING DEVICE FOR FORMING MACHINES

[76] Inventor: Yuan Ho Lee, 85, Jen Ho Road, Tainan, China /Taiwan

[22] Filed: Aug. 19, 1975

[21] Appl. No.: 605,841

[52] U.S. Cl. .................................... 83/161; 10/13; 10/25; 83/580; 83/588
[51] Int. Cl.² ........................ B26D 3/16; B26D 7/06
[58] Field of Search .................. 83/161, 580, 588; 10/13, 25

[56] References Cited

UNITED STATES PATENTS

| | | | |
|---|---|---|---|
| 1,315,963 | 9/1919 | Igou | 83/161 X |
| 2,840,164 | 6/1958 | Rudszinat | 83/161 |
| 2,966,087 | 12/1960 | Gray | 83/580 X |
| 3,082,655 | 3/1963 | Voigt | 83/580 X |
| 3,416,126 | 12/1968 | Calevich et al. | 83/580 X |
| 3,808,930 | 5/1974 | Sieben et al. | 83/580 X |

Primary Examiner—Frank T. Yost
Attorney, Agent, or Firm—Lane, Aitken, Dunner & Ziems

[57] ABSTRACT

A feedstock cutting and feeding device for forming machines of bolt nuts and other products of similar shape wherein the moving distance required by a cutter to cut off the rod material is the distance between the original position thereof and the center of the cut-off die.

2 Claims, 3 Drawing Figures

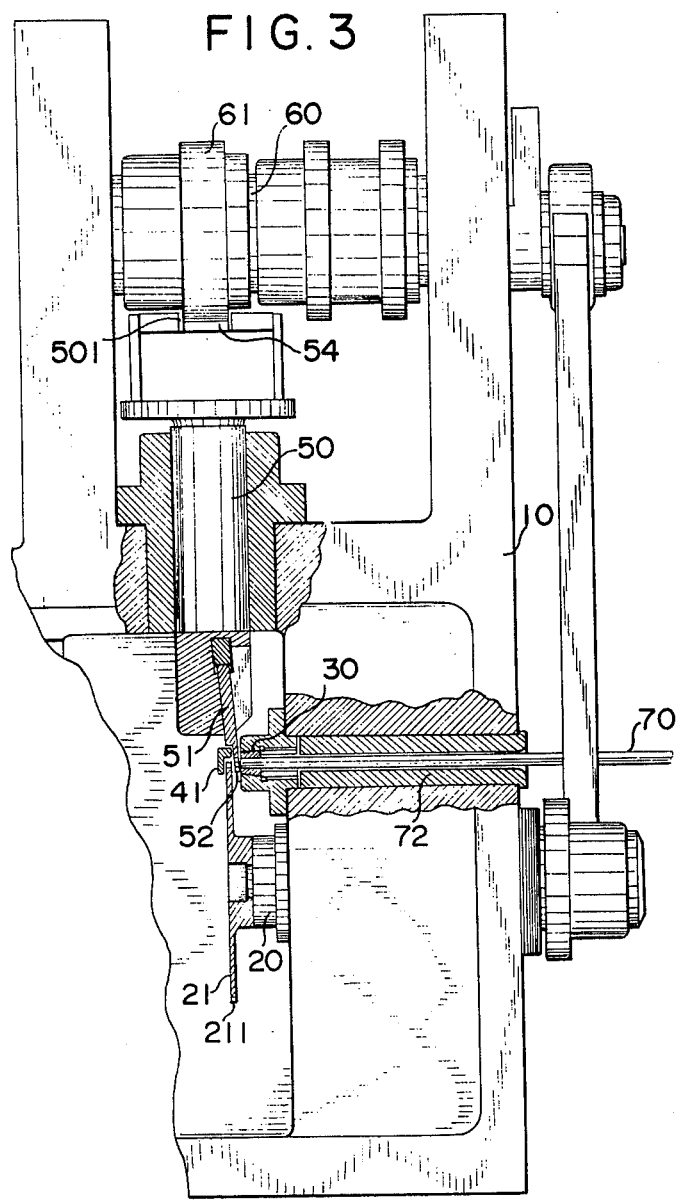

FEEDSTOCK CUTTING AND FEEDING DEVICE FOR FORMING MACHINES

BACKGROUND OF THE INVENTION

In conventional bolt and nut forming machines, the several dies are arranged in sequence at equal distances from each other in the order of the rod-cutting die, the first, second, and third die and final piercing punching stages. After the feedstock is fed to and extends from the rod-cutting die to a specified length outside the end face of the die, it is cut off by an advancing cutter at the front end of a rod-cutting shaft which moves at a right angle to the axis of the rod-cutting die and moves reciprocally back and forth. Simultaneously, the feedstock is cut off by the cutting knife and forced into a die for punch-forming before it is conveyed to the next die by the rod-cutting shaft. Thereafter, as the rod-cutting shaft moves backwards, the feed-stock is ejected from the rear and held between a clamping arm of a transfer clamp, and the feedstock is in this way conveyed from the first, to the second, and from the second to the third punching stages by virtue of the left and right movement of the clamping arm within the range of 180°.

In this way, after cutting the feedstock, the advancing movement of the rod-cutting shaft must be equal to the distance between two dies, usually about 60 mm. The distance is very long, and because of the time wasted by this motion, it is impossible to achieve high-speed operation, thus decreasing considerably the efficiency of the forming machine. As a result, a feedstock cutting and forwarding device of complicated structure is required. It is obvious that the conventional device is far from practical.

SUMMARY OF THE INVENTION

The objective of the present invention is to improve the shortcomings mentioned above and to provide a high-speed feedstock cutting and forwarding device for forming machines, in which the reciprocating stroke of a rod-cutting shaft is only the shifting distance needed in the cut-off of rod material by the cutter, and to where the cutter is situated at the center of the rod-cutting die. After the cutter advances and cuts the rod, it draws back to the original center, and further advancement of rod feed pushes the feedstock into a transferring-and-feeding disc. Thus, cutting and forwarding are effected without the need to convey the feedstock to the first die. For example, for a 10 mm rod length, the distance of transfer required between two dies is 60 mm for conventional rod-cutting shafts, whereas, moving distance of the cutter for cutting off a 10 mm rod length according to the present invention is 6 mm, and the rod-cutting shaft achieves the end through only a 6 mm reciprocating movement. Therefore, it takes 1/10 of the stroke needed by the conventional cutter. The rate of production is of very high speed and the mechanism is also quite simple.

BRIEF DESCRIPTION OF THE DRAWINGS

Herewith the present invention is explained in conjunction with appended drawings:

FIG. 3 is a plan view, partially in section, of a feedstock cutting and feeding device according to the present invention.

BRIEF DESCRIPTION OF THE PREFERRED EMBODIMENTS

Figure 1:
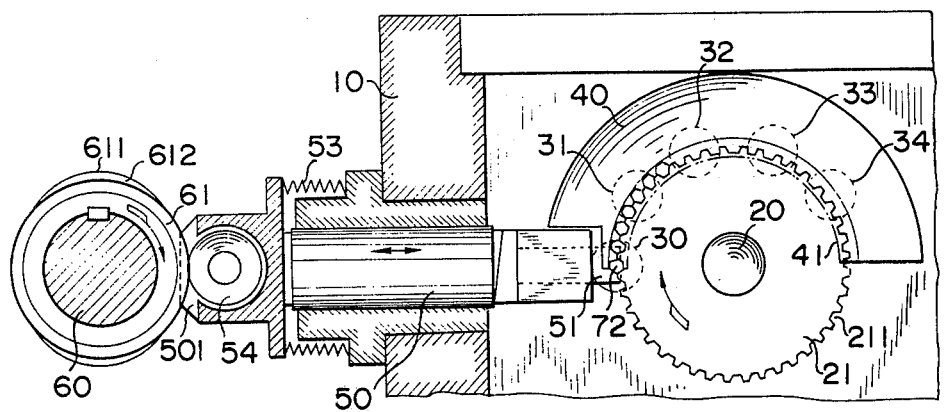
FIG. 1 is a front view, partially in section, of a feedstock cutting and feeding device according to the present invention.
Figure 2:
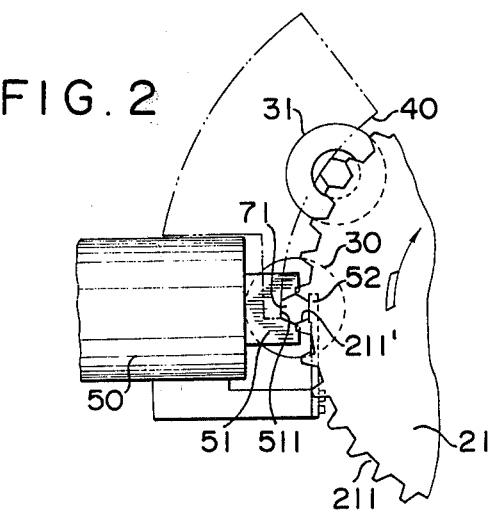
FIG. 2 is an enlarged partial front view of a cutter according to the present invention.

As shown in FIG. 1, an intermittently rotating shaft 20 is fitted on a machine body 10 and a feedstock transferring and feeding disc 21 is fixed to the shaft 20. The feedstock receiving portion of the disc 21 is on the periphery thereof which is on the same circumference as the centers of dies 30, 31, 32, 33 and 34 (shown in phantom outline). These dies are fitted on the same periphery in a sequence of a rod-cutting die, the first, second, third and final piercing die. The central interval of two dies is divided into several equal intervals with slots shaped like the external form of one side of the formed products to be received. For example, slots 211—211 form the external shape of one side of the hexagon bolt nut. At the peripheral circumference above the plurality of feedstock is fitted an arc-shaped guide plate 40 which is attached to the machine body 10. The arc-shaped plate 40 encloses a feedstock forwarding device formed by an arc-shaped guide 41. According to the present invention, the rear side position of the transferring and feeding disc 21 is adjacent to the feedstock conveyor as mentioned above. The front end of a rod-cutting shaft 50 is fitted tightly with a cutter 51 whose front part becomes a slot 511 shaped as the external form of one side of the formed material. The central position is in the center of slots 211—211, the center of the rod-cutting die 30 and the transferring feeding disc 21. Again, after the cutter slot 511 receives the formed material, a pressure contact spring strip 52 comes into contact with the external side surface of the formed material for tight holding to prevent the dropping of the formed material. In the rear end of the invention (to the left in FIG. 1) there is an opening 501 to receive a cam 61 and a roller 54 which is pivoted by a bearing. The cam 61 is fixed to a transmission shaft 60 in a position of corresponding contact with the roller 54 at the rear end of the rod-cutting shaft 50.

After a rod material 70 is fed by a feeding roll (not shown in the drawings) and extends from the end face of the rod-cutting die 30 to a specified length through a guide rail, the rod-cutting shaft driven by the transmission shaft 60 rotates the cam 61 engaged with the roller 54, the operating height 611 of the cam is set at the stroke distance required by the cutter 51 to cut off the rod material (i.e., for a length of 10 mm, it is set at 6 mm). Driven by roller 54, the rod-cutting shaft 50 advances from the central position to an operating distance at the cutting die and cuts off the rod material 70 to form a blank or feedstock 72 and holds it tightly. Due to the feeding and advancement of the rod material 70, the blank 72 held by cutter 51 is pushed into slot 211 of the transferring and feeding disc 21. Simultaneously, shaft 50 draws back to its original position by virtue of the force of the spring 53. The blank 72 is conveyed in the direction indicated by the arrow up into position with the dies by the intermittent rotation of the transferring and feeding disc 21. The blank 71 conveyed by the transferring and feeding disc is conveyed to the front and center of next die 31 by means of several intermittent rotating movements of the transferring and feeding disc 21.

I claim:

1. A high-speed feedstock cutting and forwarding device for use with and adaptable to a bolt nut forming machine, said device comprising a cutter for cutting feedstock, said cutter including means for driving said cutter in a reciprocal manner; and a transferring and conveying disc for conveying cut nut blanks away from the cutter, said disc operatively connected to and driven in a rotary motion by suitable driving means and being structurally adapted and provided at a suitable position in relationship to said cutter for receiving nut blanks cut thereby, said device being characterized in that the cutter is driven through a moving distance by said cutter driving means only about one half of the distance through the feedstock to achieve cutting thereof; and means to return the resultant blank the same distance to a suitable position for introduction to the said disc.

2. A device as set forth in claim 1 wherein the cutter consists of a blade having an indentation in the shape of one half of the external shape of the product to be formed, said blade being mounted on one end of a shaft, the other end of which is operatively connected to a roller which in turn is mounted on at least one bearing; a cam cooperating with the roller for the purpose of driving the shaft in a reciprocal motion through a suitable distance; a pressure contact spring for holding the blank in a suitable position; said transferring and conveying disc comprising a rotary disc with suitable indentations along its periphery for holding cutoff blanks and coacting with suitable driving means to drive said disc in a rotary motion for the purpose of transferring and conveying said blanks in a like motion, said rotary disc being provided at a suitable position in relationship to the cutter for receiving cutoff nut blanks cut off thereby; said device characterized in that after a blank has been cut off, the blank will be drawn back to its original position where the blank will be pushed from the blade of the cutter into a properly aligned indentation of the rotary disc by virtue of the forward advancement of the feed material used to produce the nut blanks.

* * * * *